Patented Mar. 26, 1935

1,995,963

UNITED STATES PATENT OFFICE 1,995,963

CEMENTITIOUS MATERIAL AND PROCESS OF PRODUCING THE SAME

Michele Croce, Kenmore, N. Y., assignor to Certain-Teed Products Corporation, New York, N. Y., a corporation of Maryland No Drawing. Application February 20, 1932
Serial No. 594,376

14 Claims. (Cl. 106—34)

This invention relates to materials used in the plastic arts and especially to calcined gypsum used in moulding processes and in making casts.

Various materials such as calcined gypsum, cements, clays and similar materials have been used in the plastic arts in various mixtures and compositions for the purpose of forming moulds in which to cast objects of plastic or other composition or have been used for the material of the cast itself when formed in a mould of suitable construction. Calcined gypsum or plaster of Paris has been widely used for this purpose because of its cheapness and because of the ease with which it may be handled for casting purposes as a mortar or slurry when mixed with water, part of the water being taken up as water of crystallization and causing the plaster to set rapidly.

In the production of casts particularly casts such as moulds for pottery and sanitary ware and in the production of casts for statuary as well as for plaster castings for interior decoration and for other decorative and industrial purposes calcined gypsum plasters have been commonly used. Also in the so-called dental plaster used by dentists for taking impressions, for making casts or models or for use as investments, and for the purpose of making metal casts or other dental parts calcined gypsum has found a wide and valuable field of application.

In the use of such materials, and particularly of calcined gypsum, for moulds made of plaster or for the casts themselves, a smooth hard surface and a strong structure of the mould for the casts are important. Imperfections heretofore have occurred in such moulds or casts due to the method by which it has been necessary to produce such moulds or casts and also due to the inherent physical and chemical properties of the plaster. In general in the production of the mortars or slurries from which such casts or moulds are made, the dry plaster is mixed with water to produce a slurry of pouring consistency. The resulting slurry or mortar is then poured into the mould and allowed to set. Especially with calcined gypsum defects or imperfections in the form of minute holes or "voids" are found in the structure of the cast and also larger "voids" or holes frequently are present. They also appear on the surface of the cast or immediately under the surface of the cast. These "voids" not only weaken the cast but also mar the surface of the mould of the cast and present a "pock marked" appearance on the surface of the cast. This "pock marked" appearance is especially noticeable if the surface of the cast is sandpapered or scraped as a finishing operation. Subsequent painting or coating causes these defects to be even more noticeable. Gypsum plaster moulds are extensively used in the manufacture of pottery and sanitary ware. In such moulds the presence of these "voids" or air holes is especially objectionable because if they are present on the surface in the form of "pock marks" they must be repaired to produce a smooth surface before the moulds can be used. If they are present directly beneath the surface continued use of the mould gradually wears away the surface exposing these "voids". This condition then causes imperfections on the surface of the clay objects formed in such moulds and the life of the mould is thereby reduced.

These imperfections are due to the air or gas which is entrained in the mortar or slurry from which the cast is made. It is believed that a part of this air or gas is that which is contained in the dry plaster. Such dry plasters are in powdered or pulverized condition and the air is believed to be held to the particles of the plaster by "capillary active" forces. It is well known that there exists an attraction between the surface of solids or of solid particles and gases, such as air, and that this attraction causes the gases or the air to cling to the surface of the solid particles and to form a film of the gas or air on to the solid surface which is not easily displaced. This phenomenon is well known in heat transfer apparatus, for example, where it becomes necessary to cause the heating gases to flow at high velocity over the heating surfaces so that by mechanical sweeping action of the gases the film of gas particles which cling to the solid heat transferring surfaces may be swept therefrom and thus permit other gas particles to reach the surface and transfer their heat thereto. The air which thus clings to the solid surfaces or to solid particles is termed "adsorbed" air.

It is also believed that another part of the air or gas found in the mortar or slurry is that which is held in the porous structure of the individual solid particles of the plaster and which may be termed "occluded" air.

Another part of the air or gas found in the mortar or slurry is that occupying the interstitial spaces between the solid particles of the plaster. This "interstitial" air may not cling so tenaciously to the solid particles as the "adsorbed" and "occluded" air but because it occupies the space between them or is held in this space, it represents a substantial volumetric part of the total space occupied by a mass of plaster.

An additional source of air which causes "voids" in plaster casts is that which becomes mechanically entrained in the mortar or slurry during the mixing of the dry plaster and the water. Especially with calcined gypsum, in view of its property of setting rapidly it is necessary to rapidly mix the mortar or slurry in order to make as thorough a mixture as possible before the setting is advanced too far and some air may be thus drawn into the mortar or slurry.

Originating from all the above mentioned sources air or gas is trapped in the mortar or slurry. Partly due to the consistency of the mortar or slurry and partly due to the rapid setting of plaster and also, partly due to the resistance to release of the air or gas offered by the above described capillary forces, all of the air or gas cannot escape from the mortar or slurry and the undesirable "voids" are formed in the cast by such air or gas retained upon setting of the cast.

In order to release the "adsorbed" air or gas from the particles it is necessary to destroy or counteract the capillary forces which attract the air or gas particles to the particles of plaster. If these forces and the resistance to release of the air from the particles were overcome or counteracted it is reasonable to suppose that the speed of "wetting" of the particles of plaster would be increased because if the air is driven from the surface of the particles the wetting would take place without interference by the air.

While the presence of "voids", or "pin holing", as it is called in the industry, has long been recognized as a serious defect in casts made from plasters and especially from calcined gypsum, attempts to improve this condition have not heretofore met with commercial success. In the endeavor to reduce voids, moulders and mechanics have adopted the method of adding the plaster to the proper amount of water and of allowing it to soak as long as possible before mixing, thus giving the water a longer time to wet the plaster particles and displace the air. To obtain a good cast as to "void" condition they have allowed the plaster to soak four or five minutes, whereas ordinarily the soaking time is about one minute. This method, however, only partly accomplishes the desired results probably because of the quick setting time of the plaster, the setting phenomena commencing after only a few minutes of soaking. This length of time is not sufficient to permit the displacement and removal of the air to a satisfactory degree.

The attempt has also been made heretofore to prevent the voids commonly found in a plaster cast by violent mixing or stirring of the mortar or slurry by means of a mechanically operated paddle. The mechanical force used probably causes better wetting of some of the plaster particles by frictional displacement of the air. This method, however, has certain disadvantages because it seriously hastens the setting action of the plaster and requires extra mechanical equipment. The results are dependent upon the character and violence of the action and if not properly carried out the method may not bring improvement because of whipping air into the slurry.

It is broadly the object of the present invention to provide a casting plaster which will produce casts with the "voids" therein reduced to a marked degree as compared to casts made from ordinary casting plasters.

It is a further object of the invention to provide a casting plaster with which water may be readily mixed to form a mortar or slurry, said plaster being of such character that the air or gas held in the plaster is released and removed,—thereby restricting the production of "voids" in the casting.

A further object of the invention is to provide a mortar or slurry in which the particles of plaster will be thoroughly wetted so as to readily take up the water crystallization and in which little or no air will be retained to become entrapped in the casting made from such mortar or slurry.

A still further object of the invention is to produce plaster casts, especially those made from calcined gypsum which will be strong, dense and of a close-grained structure substantially or markedly free from "voids" and providing a surface upon the cast which will be substantially free from pockets or pin holes.

Another object of the invention is to produce in a mortar or slurry prepared for moulding a plaster cast an unstable condition of the bubbles of air or gas entrained therein.

The invention also has for its object the provision of a process of producing a plaster which when mixed with the water preparatory to casting will control or prevent the imprisonment or the entrainment of air or gas which would cause "voids" in the cast.

It is a further object of my invention to provide a process of releasing the "adsorbed", "occluded" and "intersticial" air or gas carried by casting plasters when these plasters are mixed with water.

A further object is to facilitate the removal or escape from the mortar or slurry of air or gas which is released from "adsorption" on or from "occlusion" in the plaster particles or which is entrapped between the particles.

A still further object of my invention is, in a mortar or slurry of calcined gypsum prepared for forming a plaster cast, to produce dispersion of the impurities contained in the gypsum or dispersion of pigments or other coloring matter added to the plaster or to the mortar or slurry, whereby to reduce or eliminate the effect of streaks in the cast or to produce uniformity of structure or of color and appearance.

Other objects will be understood from the following description.

It is well known that the "wetting property" of water toward surfaces may be improved by decreasing the surface tension of the water by admixture therewith of a suitable surface tension depressant. Many substances have the property of lowering the surface tension of water. Some of these substances form with water molecular dispersions or true solutions in which the substance is uniformly or homogeneously dispersed in the water. Other substances capable of lowering the surface tension form with the water colloidal solutions or dispersions in which the substance in extremely finely divided or in colloidal condition is uniformly dispersed throughout the mass of the water except at the boundary of the mass of the dispersion. This boundary or "interface" may be the surface of the liquid mass or the surface of the liquid in contact with the walls of the containing vessel or in contact with other solids in the liquid mass. It also may be the surface of the liquid which surrounds a bubble of air or gas in the mass of the liquid. In such colloidal dispersion at these boundaries or "interfaces" there is a greater concentration of the substance than in the body of the liquid and such substances are termed "surface active" or "capillary active" substances. An important effect of this action is that when bubbles of air or gas, after rising through a mass of the liquid, reach the surface of the mass the film surrounding the bubbles at the surface contains the substance in the concentrated condition at the boundaries or "interfaces" of the films.

In the use with water of surface tension depressants of either type air or gas entrained in the mass of water will form bubbles which will be larger than those formed in water alone because the film of the mixture of the water and the depressant exerts less compression upon the air or gas in the bubble than that of the water alone. Because of the larger size and greater buoyancy such bubbles will rise more easily through the mass of water toward the surface of the mass.

Upon reaching the surface, however, the bubbles formed in water containing a substance which, with the water, forms a molecular dispersion will act differently from those formed in a mixture of water and a "capillary active" substance. The bubbles formed in a molecular dispersion will break at the surface of the mass and those formed in a colloidal dispersion will tend to remain as a "froth" or "foam" upon the surface. Thus the bubbles formed in a molecular dispersion in water are "unstable" and those formed in a colloidal dispersion are "stable". I utilize these properties and actions as will be described hereafter.

The present invention aims to control the creation of "voids" in casts made of plasters and especially of calcined gypsum by facilitating the wetting of the particles of the plaster or of the calcined gypsum and at the same time facilitating the release of the "adsorbed" and "occluded" gas or air. It further aims to improve the removal or escape of the air or gas so released and of the "intersticial" air as well as any air which is entrained in mixing the mortar or slurry. While in general the use of surface tension depressants to improve the wetting of a solid is known, the present invention aims to utilize the depression of the surface tension to improve the wetting of the particles of plaster and to effect the release and removal of the air or gas from the plaster and from the mortar or slurry made therefrom. If, for example, alcohol or glycerine were mixed with the water used to form a mortar or slurry the surface tension of the water would be depressed and the wetting property of the water relative to the plaster particles would thereby be increased. The water would then more readily wet the particles and the air would be driven from these particles. Moreover, if such surface tension depressants were used, the air or gas would more easily pass thru the mortar or slurry for the same reasons as given above in describing the effect upon air bubbles in water of a depression of the surface tension of the water. This air or gas would tend to rise more readily to the surface of the mortar or slurry. Upon reaching the surface such bubbles would be "unstable", would easily break and the air or gas would escape. Alcohol, glycerine, acetone and other "non-capillary" active substances therefore are suitable for the purpose of the present invention and are included in the scope of said invention. They indeed may be considered ideal from the standpoint purely of release and removal of the air or gas to reduce voids. However, because of the large amount of such substances which usually are necessary to produce the desired results and because the presence of certain of these "non-capillary" active substances in some plasters would be deleterious and also because of their cost, in some cases I prefer to use "capillary active" substance as will be hereafter described.

Surface tension depressants which as well are "capillary active", that is, which tend to concentrate at the "interface" in a mixture of such depressants with water, while acting in the same manner as the "non-capillary active" substances to increase the wetting property of water and to enlarge the bubbles and to facilitate their rise to the surface of the mortar or slurry, nevertheless may also tend to stabilize the bubbles which are enclosed within a film of the mixture of water and said substance. Such a stabilization of the bubble if maintained would be undesirable for the purpose of assisting the escape of the bubbles from the mortar or slurry because it would make more difficult the breaking up of the bubbles. Thus, from this view point alone it would appear that the use of "capillary active" substances which form a feature of the present invention would be contrary to the purpose of the invention, namely, the increased release and escape of the air bubbles from the mortar or slurry. Nevertheless it has been found that such substances, that is, those which are "capillary active" surface tension depressants and which therefore tend to concentrate at the interface of the liquid mixture, are those which are most practical in many cases for use in wetting the particles of the plaster and at the same time they are capable of acting upon the impurities in the plaster, especially in calcined gypsum, to counteract certain effects of these impurities as will be described hereafter.

The substances which I have found may be used effectively as "capillary active" surface tension depressants may be broadly classified as:
1. Soluble alkali soaps, including ammonium soaps.
2. Soluble organic soaps.
3. Soluble salts of sulphonated hydrocarbons.
4. Soluble sulphonated hydrocarbons including sulphonated oils.

While, as has been mentioned above, substances such as alcohol, glycerine, acetone, and other materials act to depress the surface tension of water when mixed therewith and within the scope of the present invention may be used to assist the removal of the bubbles from the mortar or slurry as described above, because the amount of such substances which it would be necessary to use to be effective, especially with calcined gypsum plasters in some cases would interfere with the action of the plaster or with the crystallization of the gypsum in the process of setting, their use in such cases may be disadvantageous. Surface tension depressants, however, which form colloidal solutions with water and concentrate at the interface, such as those in the four groups given above, require very small proportions relative to the quantity of plaster treated to effectively depress the surface tension and to accomplish the wetting and the release of the air or gas without interfering with action of the plaster or with the reaction of the water with the calcined gypsum or with the setting of the cast. But, as explained above, "capillary active" materials such as those in the above designated four groups tend to produce stable bubbles which are hard to break. This is a disadvantage from the standpoint of removing the bubbles from the mortar or slurry and it is necessary to overcome this tendency in order to effectively prevent "voids" in the cast. In view of the fact that these substances are of colloidal nature and that very small quantities of these materials are necessary to produce the desired wetting of the plaster particles it is possible to counteract their tendency to form stable bubbles after the wetting has been accomplished and without interfering with the action of the plaster.

One method of accomplishing this result is to add to the mortar or slurry at the proper time a reagent which will react with the surface tension depressant to produce an insoluble compound. Such reagents may be calcium chloride, calcium sulphate, calcium nitrate, zinc sulphate, iron chloride, barium chloride, etc., etc. It is known that when such insoluble compounds are colloidally dispersed in a liquid which otherwise tends to form "foam" or "froth", they are effective to prevent the formation of stable bubbles or to destroy the bubbles already formed. By causing such reagents to act subsequently to the release of the air or gas from the particles of the plaster, however this release is accomplished, the escape of the air or gas will then be facilitated because the tendency of the bubbles of air or gas to form "foam" by encasement within a film containing the surface tension depressant will be counteracted. If such a reagent is added to the mortar or slurry after the plaster and the surface tension depressant and the water are brought into intimate contact, the wetting of the plaster will have been effected by the surface tension depressant and the air or gas released thereby will be ready for removal from the mixture. By the addition of the reagent the capillary forces which effected the release are again modified and the escape of the air or gas will be then assisted instead of being resisted.

In the case of casting plasters of calcined gypsum I may similarly utilize a "capillary active" surface tension depressant of the type given in the above-mentioned four groups to cause the release of the "adsorbed", "occluded" and "intersticial" air from the particles of the plaster. In this case however it may not be necessary to add a reagent to the mortar or slurry to react with the surface tension depressant so as to offset or neutralize its tendency to form or assist in forming stable bubbles. The calcined gypsum itself may react with such depressants to form one of the insoluble compounds of the type mentioned above, namely, a calcium compound which will be effective to assist the escape of the air or gas from the mortar or slurry in the manner generally described above. Because the insoluble compound is formed "in situ" in colloidal size, and because its formation takes place substantially simultaneously with, but not before, the wetting of the plaster particles, the uniform dispersion of this insoluble compound throughout the mass of the mortar or slurry is insured. The entire mass of the mortar or slurry becomes subjected to the action at one time and completely, and the weakening or destruction of the bubble films is effectively accomplished.

Only very small quantities of the "capillary active" surface tension depressants are necessary effectively to release and remove the air and no adverse or undesirable action takes place to prevent the setting of the gypsum or the proper formation of the cast. Moreover, with plasters of calcined gypsum, since the amount of this "capillary active" material which is used is very small in proportion to the amount of calcined gypsum, the amount of calcium sulphate of the calcined gypsum with which the surface tension depressant reacts is very small, and therefore complete neutralization of the stability of the bubbles is accomplished without any adverse result and, with the formation of only a small amount of the calcium compound. Nevertheless such a small amount of the calcium compound is thoroughly effective to neutralize or counteract the stability of the bubble, causing its quick escape at the surface of the mortar or slurry. Thus the control not only of the release of the air is accomplished but of its removal.

It will be seen from the above explanation that the apparently adverse and undesirable quality of the "capillary active" substance, namely, that of stabilizing the bubbles may be counteracted, and in the case of calcined gypsum is counteracted, immediately upon effecting a thorough wetting of the plaster particles by the water containing such a "capillary active" substance. The bubbles which are released from the plaster particles, instead of being held within the film formed by the "capillary active" surface tension depressant in the water, may readily escape from the surface of the mortar or slurry.

It is also possible this action of counteracting the stability of the bubble film may assist in breaking up some of the bubbles within the mass of the mortar or slurry into bubbles of such minute size that they become uniformly distributed throughout the mortar or slurry and throughout the cast made therefrom and thus are invisible and not detrimental to the cast in its practical use. The insoluble compounds of the type described might be separately introduced into a mortar or slurry for the purpose of breaking the bubbles and destroying foam. Whether formed in situ or introduced it is to be expected that such material then may be found in the cast.

While a full explanation of the physical and chemical actions and reactions which take place in using my invention with plasters, especially with calcined gypsum, possibly is not known in the present state of the art, I attribute the results which I obtained in the reduction of "voids" in plaster casts to the interaction, in some such manner as I have above described, of the capillary forces which are modified by the presence of the surface tension depressant or of the "capillary active" surface tension depressant so as to accomplish the wetting while effecting the release of the air or gas from the particles of the plaster and the easy escape of the air or gas from the mortar or slurry. Other theories than that given above may be applicable to the proper explanation of the results obtained in this invention. However, the methods and the substances used in obtaining these results have been shown by tests and in practical use to be operative and effective.

While colloidal dispersions such as soap solutions have been used heretofore in wall plasters, that is plasters containing an aggregate such as sand or other filler, these solutions being so used as to introduce a certain amount of an integral sizing material for the purpose of reducing suction or the speed of absorption of water without substantial interference with the porosity of the plaster, and while such solutions also have been used in cellular cementitious products of certain compositions to stabilize gas bubbles and retain them in the plastic mass until it has set, and, moreover, also have been introduced into plaster wallboard in the form of a "foam" or "lather" to produce a cellular structure in the plaster core of the plasterboard, in all of which uses the object has been to obtain or to maintain a porous structure, I believe I am the first to conceive the idea of using such "capillary active" substances in connection with plaster for casting purposes, and especially in connection with calcined gypsum such as is used for plaster casts, where the opposite condition, namely, freedom from "voids", is of paramount importance. Thus I have invented a casting plaster and a method of producing the plaster and the method of producing casts made from such a plaster which is different from casting plasters and the methods heretofore known, and is also different from the plaster used for walls and similar structural purpose where the qualities of a casting plaster especially the absence of "voids" are not required and in fact may be detrimental.

Among the soluble alkali soaps as indicated in group 1 above may be mentioned the soaps of the type of which the sodium, potassium or ammonium salts of suitable organic or of fatty acids are indicative. Of the stearates, oleates, palmitates, resinates, linoleates, etc., of these metals or metallic equivalents, I have utilized effectively, for example, sodium stearate, sodium oleate, ammonium oleate and common soap such as Palmolive, Castile and Ivory soap. I have also used the resinates of the alkali metals or equivalents for example, sodium and potassium resinates with good results.

Of the organic soaps indicated in group 2 the materials which are formed by the combination of certain organic bases with certain organic acids may be used. Compounds of the fatty acids such as oleic, palmitic, butyric, or other suitable organic acids such as resinic, carbolic acids, etc., to form water soluble soaps with the organic base are suitable for the purpose. Such organic bases as triethanolamine, ethylamine and methylamine, benzylamine and ethylene diamine and many others form such compounds to produce organic soaps and may be utilized for the purpose of my invention.

Of the soluble salts of sulphonated hydrocarbons indicated in group 3 both those of the cyclic hydrocarbons and of the aliphatic type may be mentioned as effective for the purpose. For example, I have found that compounds such as sodium or potassium salts of sulphonated castor oil, cod fish oil, corn oil, olive oil, etc., may be utilized, and a compound known as "neomerpin", which is sodium isopropyl tetrahydro naphthalene sulphonate, are particularly effective.

Of the sulphonated hydrocarbons indicated in group 4 the sulphonated oils may be mentioned as effective, for example, I have effectively utilized for this purpose sulphonated mineral oil, sulphonated cod oil, sulphonated castor oil, sulphonated olive oil. Sulphonated corn oil, sulphonated tallow and sulphonated Menhaden fish oil may also be used. Mixtures of these sulphonated oils are also effective.

In my experiments I have found that the effect of the use of such surface tension depressants and "capillary active" substances may be varied by varying the quantity of such substances used. I have also discovered that the addition of too much of the substance, even though the amounts used are relatively small, may in some cases prevent or reduce the desired action. In the use of some substances, particularly those which are most suitable from the commercial standpoint because of cost or availability or of the ease of handling or other reason, the amount of such substance which produces the best results is usually a fraction of 1% relative to the plaster with which it is to be used. For example, in the use of sulphonated oil such as sulphonated cod oil, sulphonated castor oil (Turkey red oil) I have found that as small an amount as eight ten-thousandths of one percent (.0008%) expressed as a percentage of the weight of the dry plaster is sufficient to produce a noticeable reduction in the amount of "voids" formed in a cast as compared with the "voids" formed in a cast made of the plaster alone. In the practical utilization of such sulphonated oils I have used them in amounts ranging from two thousandths of one percent to six thousandths of one percent (.002% to .006%.)

When using soaps such as sodium salts of the fatty acids, I have found that proportions of the degree of one-one hundredth of one percent (.01%) produce casts remarkably free from voids. Proportions of the same degree are effective in the use of organic soaps and I have found that a range of from five thousandths of one percent (.005%) to fifteen thousandths of one percent (.015%) produces good results. In using materials classified in the third group, for example neomerpin, I have found that a range of percentage of five-thousandths of one percent (.005%) to fifteen thousandths of one percent (.015%) produces good results. It will be evident from these figures that the amount of "capillary active" substance which it is necessary to use effectively to reduce the surface tension of the water and to accomplish the wetting of the plaster particles with the release and removal of the air from the plaster and, in the manner described above, to cause the air bubbles to collapse or burst when reaching the surface is surprisingly small. Nevertheless I have accomplished the purpose of my invention by the use of materials which I propose in proportions of which those indicated are typical.

On the other hand, in my experiments in some cases and with some materials I obtained improvements in the "void" condition of the cast when these materials were used in amounts as high as 2.0% of the dry weight of the plaster. However, the water carrying capacity of the plaster and the testing consistency of the mortar or slurry were increased which necessitated the use of more water to produce the mortar or slurry. The additional water made a more porous and a weaker and lighter cast which for most casting purposes is disadvantageous. When the plaster is prepared and used according to my invention with proper proportions of the materials the density is increased and the tensile and compressive strength of the cast is increased 10 to 15%.

In the practical use of my invention I have successfully carried out its purpose by combining with the plaster during the process of its manufacture the surface tension depressant which is utilized to effect the reduction of the "voids". For example, in the manufacture of calcined gypsum I have found it practicable to introduce the surface tension depressant during the process of calcination. Since the substances used for the purpose of effecting the reduction of surface tension are capable of dispersion in water it is possible to disperse or to dissolve the desired quantity of the depressant in a convenient amount of water and to spray this dispersion or this solution into contact with the gypsum being calcined in the calcining equipment. Thus I have made soap solutions or solutions of sulphonated oils in water and have sprayed these solutions directly upon the gypsum during the process of calcination. For example, I have used Ivory soap in the proportions of two tenths (2/10) of a pound of Ivory soap per ton of calcined gypsum (equivalent to .01%) or in the case of the sulphonated cod oil I have used eight-hundredths to twelve-hundreths of a pound (.08 to .12 of a pound) per ton of calcined plaster (equivalent to .004% to .006%). This soap solution or the solution of sulphonated cod oil was introduced into the kettle in which the gypsum was being calcined, which kettle had a content of eleven (11.0) tons of gypsum. Thus 2.2 lbs. of Ivory soap or between .8 lbs. and 1.3 lbs. of sulphonated cod oil were used to treat the gypsum calcining in this kettle. These proportions are given merely as examples and the invention is not limited to these particular proportions.

When these surface tension depressants are mixed with a sufficient amount of water to permit spraying on the top of or into the calcining mass of gypsum the desired permeation of the mass of the gypsum by the surface tension depressant is accomplished. The completeness of this admixture is due to the calcining action which is in the nature of a boiling action, and to the mechanical agitation produced by the agitating device in the calcining equipment. The calcined gypsum product when removed from the kettle thus contains the desired surface tension depressant. When such a product is used to make a mortar or slurry the physical actions take place which accomplish release of air and limitation of the "voids" in the cast as described above, the wetting of the particles preceding the release and the defrothing reaction.

In another manner of carrying out my process, for the purpose of introducing the surface tension depressant, I may use a solid carrier such as talc or silex, which may be intimately mixed in a suitable manner with the depressant. The required amount of this mixture may be introduced into the calcining equipment or may be mixed with the finished calcined product. The talc acts as a diluent of the surface tension depressant and thus provides a larger bulk of material to be introduced into the calcining vessel for distribution through the mass of the calcining material. It also affords a convenient means for distributing the surface tension depressant through the calcined plaster itself when the depressant is to be mixed with the plaster. A more uniform distribution in some cases thus may be produced by using such a carrier. Such carriers are not of a character nor used in such quantities as to constitute a substantial part of the plaster, such as an aggregate.

The use of the materials and the methods of my invention do not interfere with certain other treatments which are given to gypsum or to calcined gypsum plaster. For example, it has been proposed heretofore to introduce into the calcining equipment, during the process of calcination of gypsum to produce calcined gypsum, certain materials such as chloride of an alkali metal or its equivalent or otherwise to add such a material to the gypsum prior to the mixture of the calcined product with water. The purpose of the admixture of this material is to reduce the water-carrying capacity of the resulting plaster so that less water is needed to produce a given consistency of the mortar or slurry than that required for the normal plaster. A denser cast is thus produced. The process of my invention may be carried on and the substances which I utilize may be introduced simultaneously with, or in other convenient relation to, the treatment of the mass of the gypsum to reduce the water-carrying capacity of the plaster. If desired however the admixture of the alkali chloride during calcination for reducing the water-carrying capacity may be made with the gypsum which has previously been treated for reduction of "voids" or which contains the materials proposed according to my invention for reducing the "voids" in plaster casts. Moreover, the methods of my invention and the substances used in accordance therewith may be used to improve the "void" condition in plasters, the plasticity of which has been modified by grinding or which have otherwise been treated for various purposes.

I have also found it convenient under some conditions to prepare the surface tension depressants in liquid form by mixing a suitable amount of the depressant with water or with some other suitable solvent. The solutions or dispersions thus formed may then be mixed either with the plaster immediately prior to preparing the mortar or slurry or may be added to the water used to produce the mortar or slurry. It is important, however, that the depressant be dispersed either in the plaster or in the mixing water before mixing the two together if it is to be effective for release and escape of the air from the slurry thus produced. In the case of calcined gypsum I have found that if the surface tension depressant is introduced after the plaster has come into contact with the water in the process of forming a slurry the desired results are not obtained, or are not obtained to the same degree. The reason I assign for this action is that the water dissolves some of the calcined gypsum and this is then free to counteract, as described above, the effect of the surface tension depressant.

Other convenient methods and means of insuring the presence of the surface tension depressant as well as of the foam killer or counteracting agents mentioned above, if such are used, may be adopted within the scope of my invention.

I have also found that by using the process and material of my invention improvement is made in the character of the casts made from those plasters, especially calcined gypsum, which are produced from the raw material containing impurities. In the case of gypsum these impurities exist as shale and as limestone in the gypsum rock.

It has been noted in making casts of such plasters that the varying amounts of the shale impurity found in gypsum rock deposits have a decided effect on the number of "voids" or pinholes formed in a cast of the plaster or calcined gypsum produced from such an impure gypsum mineral. Experience has shown, for example, that a gypsum rock containing a relatively small amount of shale as an impurity will produce a plaster, when made according to the process heretofore known, which will make a casting containing fewer "voids" than the plaster made from a gypsum rock containing a larger percentage of shale. This effect also can be shown by adding a half of one percent or more of pulverized shale to a relatively pure calcined gypsum and then making a cast in the usual manner. In this case a casting is obtained which contains many more "voids" than are found in a casting from the same calcined gypsum without the addition of the shale. As shale, as it occurs with the mineral from which plasters are made, is composed of many different minerals, some of which, especially kaolinite and organic carbonaceous matter, occur in very finely divided or colloidal size, one explanation of this result, namely, the production of a larger number of "voids" in a cast from a plaster containing the shale, may be that the colloidal particles present in the shale strongly "adsorb" gas or air, thereby increasing the amount of air introduced into the slurry. By using the process and the materials of my invention, the wetting property of the water toward the particles of shale will be increased in the same manner as its property for wetting the particles of the plaster, with the resulting release of the "adsorbed" and "occluded" air from the shale particles which also then may have the opportunity to escape from the mortar or slurry in the manner described above.

Moreover, it has been found in practice heretofore that these impurities which are present in the calcined gypsum produce dark spots or streaks in the cast, thus marring the appearance. The colloidal carbonaceous or kaolinite particles show a decided tendency to be absorbed into, or concentrated in, the interface. Not only does this action noticeably increase the strength of the bubble film surrounding the air or gas in the mortar or slurry, but the colloidal material thereby is retained on the surface of the mortar or slurry and at the walls of the mould. The formation of the dark colored scum and of tenacious bubbles on the surface of the slurry, producing dark colored streaks or spots on the surface of the set cast, is attributed to this action. I have discovered that the surface tension depressants used in my invention are also effective to disperse throughout the mass of the mortar or slurry the colloidal solid particles of shale. The tendency of these particles to concentrate at the interface and thus to produce the streaks and spots on the surface of the cast, as has been described, is thus counteracted and a uniform surface appearance as well as a more uniform distribution of the impurities throughout the structure of the cast is provided.

I have found that I may utilize this action of my invention to disperse pigments or colors throughout the mass of the mortar to produce a colored cast or one having the white plaster appearance modified. It thus is possible to disperse such materials as lamp black, sienna, ochre, etc., throughout the mortar or slurry prepared for making a cast. These materials may be mixed in a convenient manner with the dry plaster or may be mixed directly in the mortar or slurry, the resulting cast having a uniform color and without the streaks and spots, above described, which are found in the use of ordinary plasters.

In my experiments, in the effort to assist the removal and escape of the air or gas from the mortar or slurry I have also tried such well-known "defrothing agents" as pine oil, kerosene, and coal tar light oils, some of which have been used heretofore in the manufacture of paper and paper products to reduce or destroy the "foam" or "froth" experienced in the processes of manufacture of these products. When such "defrothing agents" were mixed with the mortar or slurry it was found that they acted to break up the bubbles but, because these materials are not surface tension depressants of water, they were not effective for improving the wetting of the plaster particles and for effecting the release of the "adsorbed" and "occluded" air from these particles. From this standpoint, therefore, they are not so effective as the surface tension depressants but may be used in some cases to assist in destroying the films or preventing "foam" formation.

The invention contemplates the use of materials which will depress the surface tension of water to accelerate and increase the wetting of the particles. I also utilize materials which, while having this property, also have the characteristic of reacting with the plaster itself or with a suitable reagent which is not deleterious to the action of the plaster for the purpose and does not prevent the setting of the plaster. The combination of these characteristics in a material which is commercially available and practical and the use of such a material that it will be modified by said reagent or by the plaster itself so as to reduce or destroy the property of the surface tension depressant tending to cause the "foam" or "froth", after said depressant has served its purpose in releasing the air, is an important feature of the invention.

The reduction of the "voids" in casts or moulds, with the resultant more uniform wearing surface and increased density, as well as an increased tensile and compressive strength, the more uniform appearance of the cast and the elimination of discoloration by dispersion of the impurities in the plaster, is accomplished by the methods and by the use of the materials for carrying out the methods of my invention. The invention, therefore, constitutes an important improvement in the art of producing plasters for casting purposes and of making casts from these plasters.

Although the word plaster by definition includes the plastic mass such as that made by a mixture of calcined gypsum with water, in the above description of my invention, I have used the word plaster for the most part to designate the dry material as prepared for such use and mixture with the water. The invention, however, is not limited to such dry plasters and the methods of producing the same but includes the mixtures of such plasters to form plastic masses or to form mortars or slurries for pouring in moulds to make plaster casts. Moreover, as the type of plaster used for making plaster casts for the most part is without admixture of aggregates or fillers, although a certain amount of finely divided material may be used for certain purposes some of which purposes have been described above, my invention finds particular application to what may generally be termed neat plasters as distinguished from those which have aggregates or other solid or filler materials admixed therewith in relatively large amounts in order to provide certain qualities, for example, a porous structure or strength or to modify the setting time, such materials as sand, lime and fibre being used for this purpose in wall plasters.

The invention, however, may be applied to the production and use of casting plasters and similar materials used for making casts without departing from the spirit of the invention and all such uses are included within the scope of the invention.

What I claim is:—

1. Process of producing calcined gypsum casting plaster which comprises adding to the gypsum as it is being calcined a substance having the property of reducing the surface tension of water.

2. Process of producing casting plaster which comprises treating a cementitious material having the properties of a casting plaster with a soluble organic soap.

3. Process of producing calcined gypsum casting plaster having, when mixed with water and moulded to form plaster casts, the quality of restricting the formation of voids in the cast which comprises spraying into contact with the gypsum as it is being calcined a dilute water solution of sulphonated cod oil.

4. A plaster of calcined gypsum for making plaster casts, said plaster having therein a fractional percentage of a soluble organic soap.

5. A mixture comprising a cementitious material capable of setting when mixed with water, and a substance selected from a group consisting of soluble alkali soaps, soluble organic soaps, soluble salts of sulphonated hydrocarbons and soluble sulphonated hydrocarbons including the sulphonated oils, said substance being present in the mixture in an amount between .0008% and .015% of the weight of the cementitious material.

6. A mixture comprising a cementitious material capable of setting when mixed with water, and a substance having the property of reducing the surface tension of water and of forming a colloidal dispersion in water, said substance being present in the mixture in an amount between .0008% and .015% of the weight of the cementitious material.

7. A mixture comprising a cementitious material capable of setting when mixed with water, and a soluble alkali soap in amount not substantially greater than .015%.

8. A mixture comprising a cementitious material capable of setting when mixed with water, and a soluble organic soap in amount between .005% and .015%.

9. A mixture comprising a cementitious material capable of setting when mixed with water, and a soluble salt of a sulphonated hydrocarbon in amount between .005% and .015%.

10. A mixture comprising a cementitious material capable of setting when mixed with water, and a sulphonated oil in amount between .002% and .006%.

11. A mixture comprising a cementitious material capable of setting when mixed with water, and sulphonated cod oil in amount substantially between .004% and .006%.

12. A mixture comprising a cementitious material having the property of setting when mixed with water, and between .0008% and .015% of a substance having the property of forming with water a colloidal dispersion while reducing the surface tension of water, said substance being of such character that said property becomes so modified upon adding water to said mixture as at least partially to restore the surface tension condition of the water.

13. A mixture comprising calcined gypsum, and a substance having the property of forming with water a colloidal dispersion and of reducing the surface tension of the water to increase the wetting property of the water toward the calcined gypsum and to increase the stability of the liquid film, said substance being capable of reaction with the calcined gypsum upon the wetting thereof to form a mortar or slurry so as to decrease the stability of the liquid film, said substance being present in the mixture in an amount substantially between .0008% and .015% based on the weight of the calcined gypsum.

14. The process of producing a casting plaster of calcined gypsum which comprises causing to be mixed with the calcined gypsum in such a way as to insure its presence therein when water is added to said mixture to form a mortar or slurry a substance having the property of reducing the surface tension of water and of forming a colloidal dispersion in water, the amount of said substance in relation to the amount of the calcined gypsum being between .0008% and .015%.

MICHELE CROCE.